United States Patent [19]
Hoppman et al.

[11] Patent Number: 5,799,615
[45] Date of Patent: Sep. 1, 1998

[54] ROLL-UP CROWD GATE

[75] Inventors: David P. Hoppman; Chris Hoppman, both of Fond du Lac; Eric Klein, Campbellsport; Kevin L. Daleiden, Van Dyne, all of Wis.

[73] Assignee: A. F. Klinzing Company, Inc., Fond du Lac, Wis.

[21] Appl. No.: 890,078

[22] Filed: Jul. 9, 1997

Related U.S. Application Data

[60] Provisional application No. 60/021,706 Jul. 12, 1996.
[51] Int. Cl.$^6$ .............................. A01K 29/00; A01K 3/00
[52] U.S. Cl. ........................................................ 119/510
[58] Field of Search ............................... 119/510, 518, 119/524, 840, 843

[56] References Cited

U.S. PATENT DOCUMENTS

| | | | |
|---|---|---|---|
| 3,805,741 | 4/1974 | Thompson et al. | 119/510 |
| 3,908,599 | 9/1975 | Flocchini | 119/510 |
| 3,921,586 | 11/1975 | Sweeney et al. | 119/510 |
| 4,006,714 | 2/1977 | Goossen | 119/510 |

OTHER PUBLICATIONS

"Full–Control Crowd Gate" commercial brochure of Blue Diamond Manufacturing Co., Mount Vernon, WA no date.
"Goossen Moo–ver" commercial brochure of Goossen Industries, Beatrice, NE 68310 no date.

*Primary Examiner*—Robert P. Swiatek
*Assistant Examiner*—James S. Bergin
*Attorney, Agent, or Firm*—Donald Cayen

[57] ABSTRACT

A roll-up crowd gate comprises an electrically charged drum that is rotatable in a carriage. Long cables connected to the drum are also electrically charged. A rope translates the carriage in tracks between upstream and downstream locations. Translation of the carriage in the downstream direction when the cables are unrolled from the drum urges a first herd of cows to the downstream location. Carriage stops in the tracks stop carriage translation at the downstream location, but continued operation of the rope when the carriage is against the stop causes the drum to roll up the cables. Reverse operation of the rope translates the carriage above the first herd to the upstream location. A carriage stop at the upstream location stops carriage translation, but continued operation of the rope rotates the drum and unrolls the cables behind a second herd of cows.

28 Claims, 5 Drawing Sheets

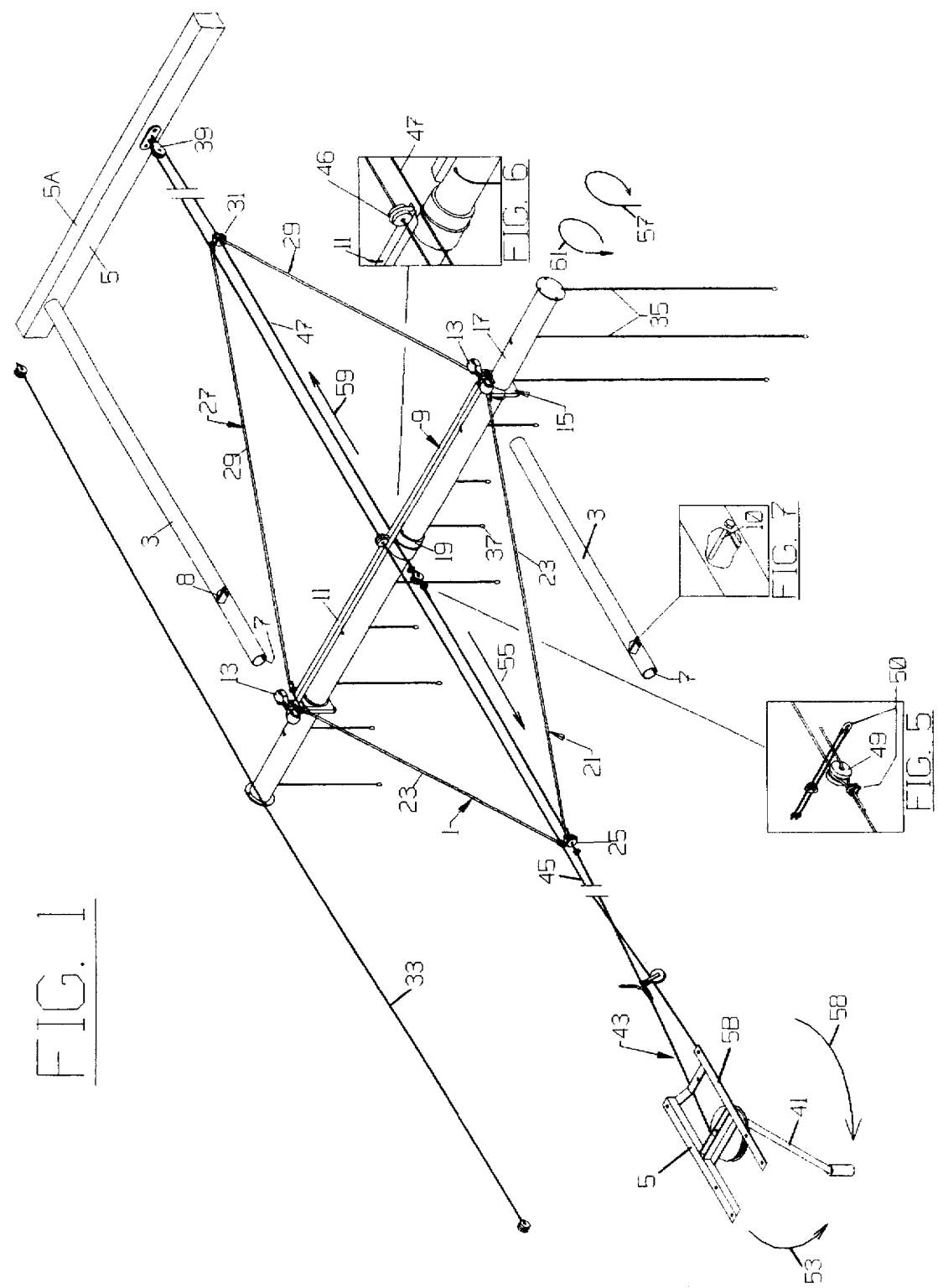

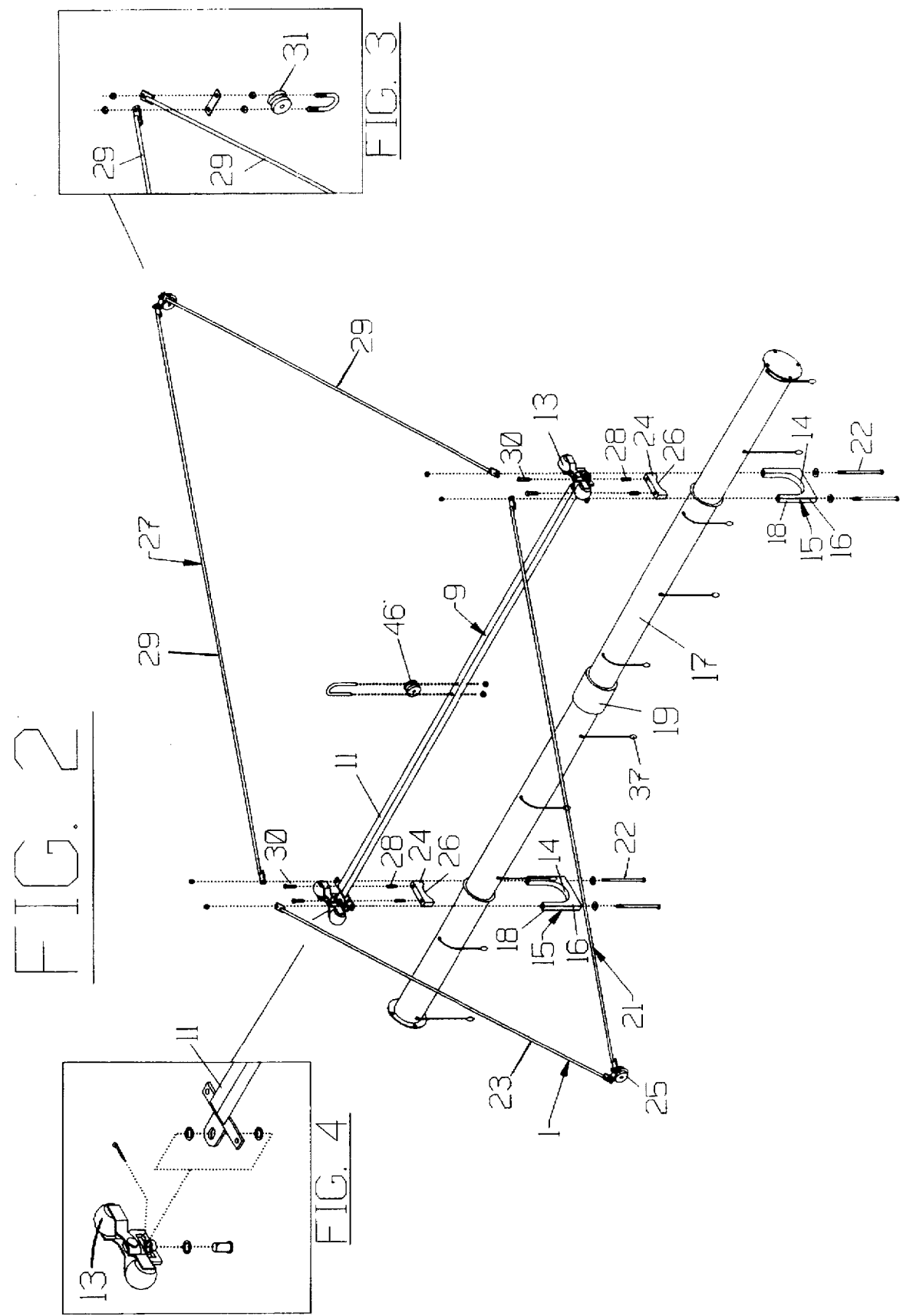

5,799,615

1

ROLL-UP CROWD GATE

This is a continuation-in-part of copending provisional application Ser. No. 60/021,706 filed on Jul. 12, 1996.

BACKGROUND OF THE INVENTION

1. Field of the Invention

This invention pertains to animal control, and more particularly to apparatus that guides the movement of cattle between two locations.

2. Description of the Prior Art

In the dairy industry, it is a longstanding problem to control the movements of cows from a gathering area to their milking stations. Past attempts to solve the problem include a crowd gate built by Blue Diamond Manufacturing Company of Mount Vernon, Wash. In the Blue Diamond system, a mechanical gate is swingable between raised and lowered positions. The gate is also translatable horizontally. The gate is lowered behind a first herd of cows at the gathering area and then slowly advanced toward the milking stations. The advancing gate persuades the cows to walk in a downstream direction. A second herd can fill in the gathering area behind the advancing gate. When the first herd has left the gathering area and it is decided to move the second herd from the gathering area to the milking stations, the gate is raised and then translated in the upstream direction back behind the second herd. The gate is lowered, and the process is repeated until all the cows have been transferred from the gathering area to the milking stations.

Another crowd gate is manufactured by Goosen Industries of Beatrice, Nebr. In the Goosen crowd gate, several long horizontal bars are suspended in spaced vertical relation by vertical cables. The vertical cables support the bars at different locations along the length of the bars. The cables also provide an electrical voltage to the bars. Operating a drive mechanism selectively acts on the cables to raise or lower the horizontal bars in the manner of a venetian blind. The drive mechanism, cables, and bars are translatable as a unit horizontally. The bars are lowered behind a first herd of cows at the gathering area. Slow advancement of the drive mechanism, cables, and bars urges the cows to move in the downstream direction to the milking stations. A second herd of cows can move into the gathering area behind the first herd. When it is desired to move the second herd to the milking stations, the drive mechanism is operated to raise the cables and bars. The drive mechanism, cables, and bars are then translated back upstream and lowered behind the second herd.

The prior equipment is undesirably costly to install and unreliable in operation.

SUMMARY OF THE INVENTION

In accordance with the present invention, a roll-up crowd gate is provided that is more economical and convenient to operate than prior equipment. This is accomplished by apparatus that includes a series of electrified cables suspended from a rotatable and translatable drum.

The drum is supported for rotation within and is electrically insulated from a carriage. The carriage is supported on overhead tracks high above a floor. The tracks enable longitudinal movement of the carriage and drum between upstream and downstream ends. A horizontal wire parallel to the tracks and charged with electricity from a conventional livestock training system is always in contact with the drum.

A long continuous wire rope extends between and is trained over a pulley at one end of the tracks and a drive

2 wheel at the other end of the tracks. One run of the rope is direct between the pulley and the drive wheel. The second run of the rope is wrapped around the drum. There is a first carriage stop in the tracks at a first location near the drive wheel, and a second carriage stop at a second location near the pulley. Turning the drive wheel in opposite directions causes the rope to pull the drum and carriage along the tracks in corresponding opposite directions between the first and second carriage stops. The drum does not rotate as long as the carriage does not strike a carriage stop.

The cables are flexible, and they are each connected by one end at spaced intervals along the length of the drum. The free ends of the cables need not be at equal distances above the floor. The cables are electrified through the contact of the drum with the electrified horizontal wire in contact with the drum.

To use the roll-up crowd gate, the carriage and drum are initially at the upstream end of the tracks. The cables are unrolled and dangle from the drum. A dairyman turns the drive wheel in a first direction such that the carriage and drum are pulled together by the rope toward the downstream end. Doing so guides a first herd of cows from near the upstream end of the tracks to walk toward the downstream end. Downstream guidance of the cows continues until the carriage strikes the first carriage stop. Continued turning of the handwheel causes no further translation of the carriage. However, as the rope continues to be pulled by the drive wheel, it rotates the drum in a first direction to roll the cables onto the drum. A drum stop limits the amount of drum rotation.

Subsequent rotation of the drive wheel in the opposite direction causes the carriage and drum to translate together in the upstream direction over a second herd of cows until the carriage strikes the second carriage stop. Continued rotation of the handwheel causes the drum to rotate in a second direction and unroll the cables from the drum. The drum stop also limits the rotation of the drum in the second direction. The cycle is then ready to repeat.

Other advantages, benefits, and features of the present invention will become apparent to those skilled in the art upon reading the detailed description of the invention.

BRIEF DESCRIPTION OF THE DRAWINGS

FIG. 1 is a partial perspective view of the roll-up crowd gate of the present invention.

FIG. 2 is an exploded view of a portion of the roll-up crowd gate.

FIG. 3 is a first enlarged detail of a portion of the roll-up crowd gate.

FIG. 4 is a second enlarged detail of a portion of the roll-up crowd gate.

FIG. 5 is a third enlarged detail of a portion of the roll-up crowd gate.

FIG. 6 is a fourth enlarged detail of a portion of the roll-up crowd gate.

FIG. 7 is a fifth enlarged detail of a portion of the roll-up crowd gate.

DETAILED DESCRIPTION OF THE PREFERRED EMBODIMENT

Figure 8:
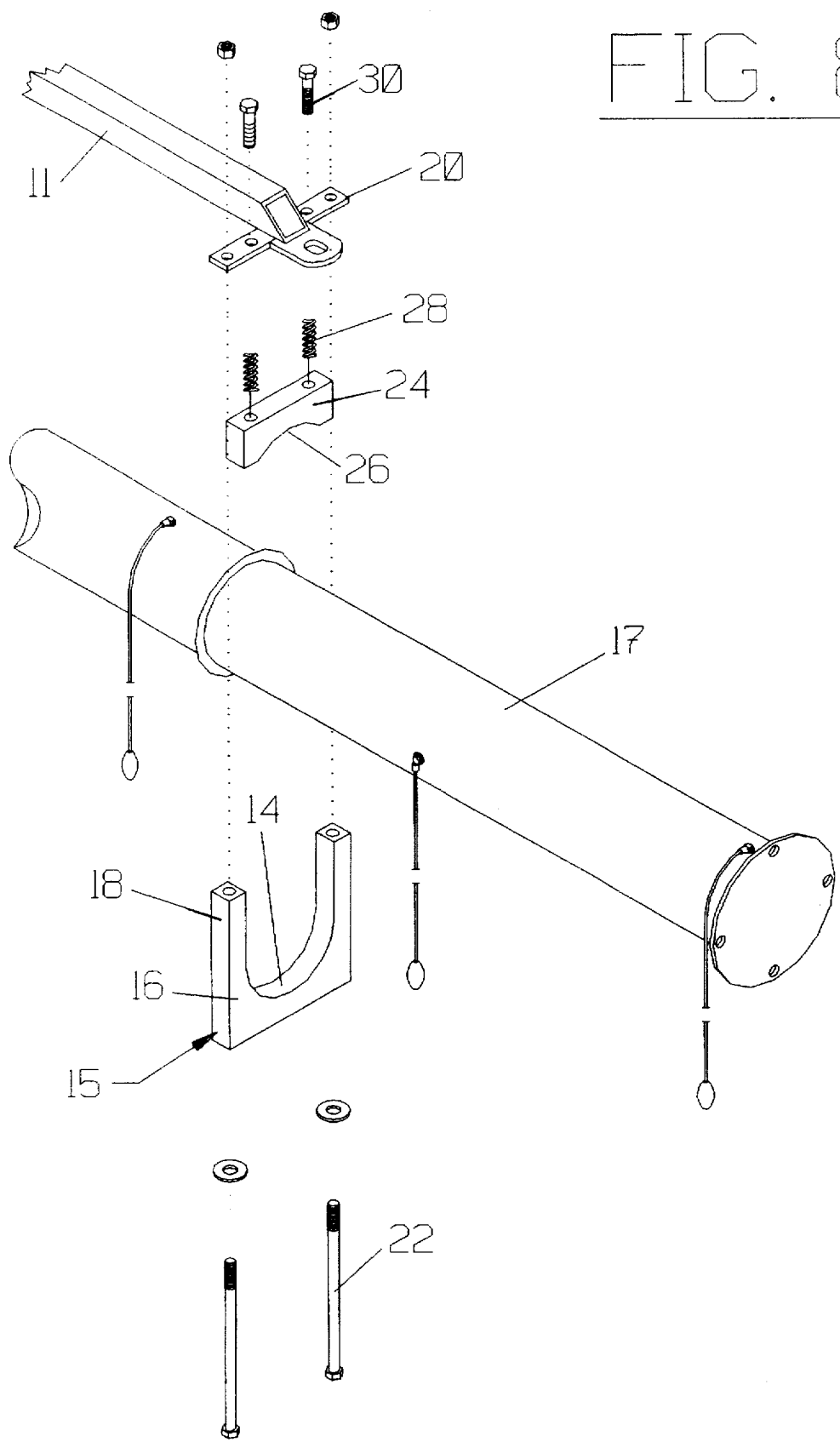
FIG. 8 is an enlarged exploded perspective view showing the bearing for the tube.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Looking at FIGS. 1–8 of the drawings, reference numeral 1 indicates the roll-up crowd gate of the present invention. It is comprised of a pair of horizontal and parallel tracks 3 that are suspended from a frame 5 above the floor of a cow milking parlor or the like. In FIG. 1, the portion of the frame 5 designated as 5A will be considered an upstream end of the frame, and the portion 5B will be considered a downstream end of the frame. The tracks 3 are preferably generally circular in shape and have full length slots 7 in their bottom portions. In each track is an upstream carriage stop 8 and a downstream carriage stop 10.

Supported by the tracks 3 is a carriage 9. The carriage 9 comprises a long beam 11 supported on its opposite ends by a pair of trolleys 13. The trolleys 13 ride in respective tracks. Fastened to the beam 11 near each trolley is a bearing 15 made of an electrically insulative material. The bearings 15 rotatably support a long metal drum 17.

In the illustrated construction, each bearing 15 is comprised of a fixed block 16 having legs 18 and a semi-circular journal 14. The diameter of the journal 14 is the same as the diameter of the drum 17. The fixed block 16 is joined to a cross plate 20 of the beam 11 by long bolts 22. A moveable block 24 has an arcuate surface 26 of the same diameter as the drum. The moveable block 24 slidingly fits between the legs 18 of the fixed block. Springs 28 are guided on screws 30 that are threaded to the beam cross plate 20. The springs 28 bias the moveable block against the tube, and the tube against the fixed block. Both bearing blocks are made from an anti-friction synthetic material, such as ultra-high molecular weight nylon.

An insulative sleeve 19 is keyed onto the drum 17 midway between the trolleys 13. The carriage 9 further has a downstream stabilizer 21 in the form of two long bars 23 fastened each at one end to a respective trolley. The second ends of both bars 23 are fastened to one ring insulator 25. A similar upstream stabilizer 27 has long bars 29 and a ring insulator 31.

A number of long flexible steel cables 35 are connected at respective first ends to the drum 17. All the cables 35 may be of the same length. They may be connected at different angular positions around the drum. If so, the free ends of the cables are at different distances above the floor. The free ends of the cables are provided with weights, which may be spheres 37 of coated lead.

At the frame upstream end 5A is a pulley 39. A drive wheel and handle 41 are at the frame downstream end 5B. A long rope 43 is trained over the pulley 39 and drive wheel 41. We prefer that the rope 43 be a plastic coated wire rope. The ends of the wire rope are joined by a ring insulator 49 and u-bolts 50 such that the wire rope is essentially continuous. One run 45 of the wire rope extends directly between the pulley and the drive wheel. The wire rope first run 45 is guided in a ring insulator 46 attached to the long beam 11. The second run 47 of the wire rope is wrapped around the sleeve 19 on the drum 17. The wire rope second run 47 is guided in the carriage ring insulators 25 and 31.

The ring insulator 49 is on the second run 47 of the wire rope 43 and is located between the drum 17 and the ring insulator 25. The ring insulator 49 acts as a drum stop, as will be explained.

A conventional livestock training system is located at any convenient place within the milking parlor. A long horizontal wire 33 of the training system is laid on top of the drum 17 and extends between the frame upstream and downstream ends 5A and 5B, respectively. Consequently, the drum and cables 35 are electrified whenever the animal training system is energized. However, it will be recognized that the remainder of the roll-up crowd gate 1 is insulated from the drum and the cables by the bearings 15 and the sleeve 19.

The roll-up crowd gate 1 is used to control the movement of dairy cows or the like in a downstream direction from the frame upstream end 5A to the frame downstream end 5B. For that purpose, it will initially be assumed that the carriage 9 is at the upstream end and the cables 35 are dangling freely from the drum 17, as is shown in FIG. 1. In that situation, the trolleys 13 are in contact with the downstream side of the upstream carriage stop 8, and the ring insulator 49 is close to the drum.

The dairyman turns the drive wheel 41 in the direction of arrow 53. That action causes the wire rope run 47 to pull the carriage 9 and drum 17 together in the downstream direction 55. The stabilizers 21 and 27 aid in guiding the two carriage trolleys 13 to roll evenly along the tracks 3. The ring insulators 25 and 31 guide the wire rope run 47 onto the sleeve 19. The dangling electrified cables 35 urge the cows to walk in the downstream direction 55. Continued turning of the drive wheel causes continued downstream translation of the carriage and drum until a trolley 13 strikes the downstream carriage stop 10. At that point, continued turning of the drive wheel does not cause any further translation of the carriage and drum. However, continued turning of the drive wheel does continue to pull the wire rope run 47 in the direction of arrow 55. The result is that the drum rotates in the direction of arrow 57 to roll the cables onto the drum. The spring loaded moveable blocks 24 of the bearings 15 compensate for any irregularities in the diameter of the drum. Drive wheel turning go and drum rotation continue until the drum stop 49 strikes the ring insulator 25. At that point, the cables are fully rolled up on the drum, and no further turning of the drum wheel in the direction of arrow 53 is possible.

The dairyman then turns the drive wheel 41 in the direction of arrow 58. That turning causes the wire rope run 47 to pull the carriage 9 and drum 17 with the rolled up cables 35 in the upstream direction 59. Upstream translation of the carriage and drum continues until a trolley 13 strikes the upstream carriage stop 8. Continued turning of the drive wheel in the direction of arrow 58 causes the wire rope run 47 to rotate the drum in the direction of arrow 61. That rotation causes the cables 35 to unroll from the drum. Turning the drive wheel and corresponding rotation of the drum continue until the drum stop 49 contacts the drum sleeve 19. The cycle is then ready to be repeated.

Figure 9:
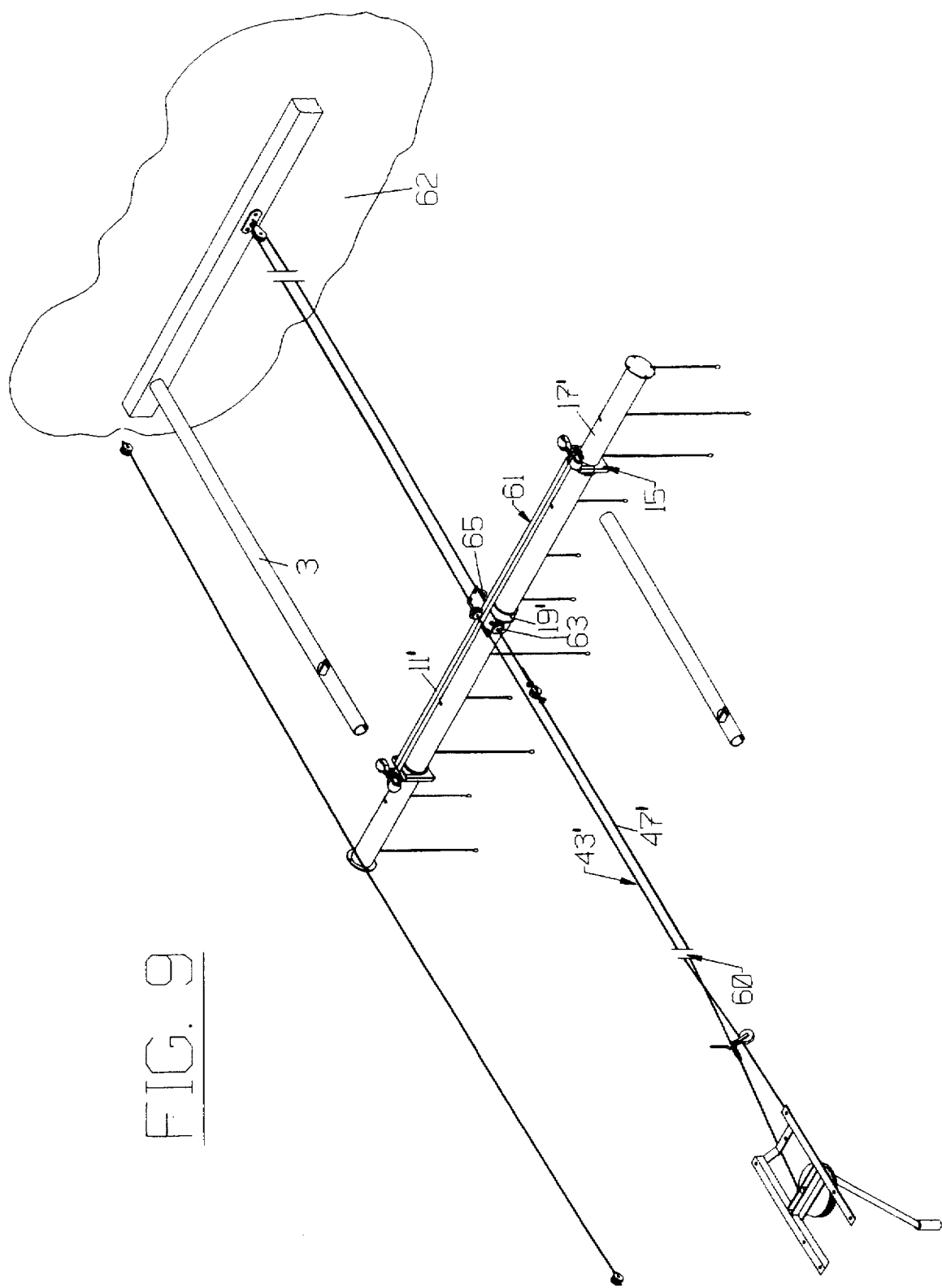
FIG. 9 is a view similar to FIG. 1, but showing a modified embodiment of the invention.
Figure 10:
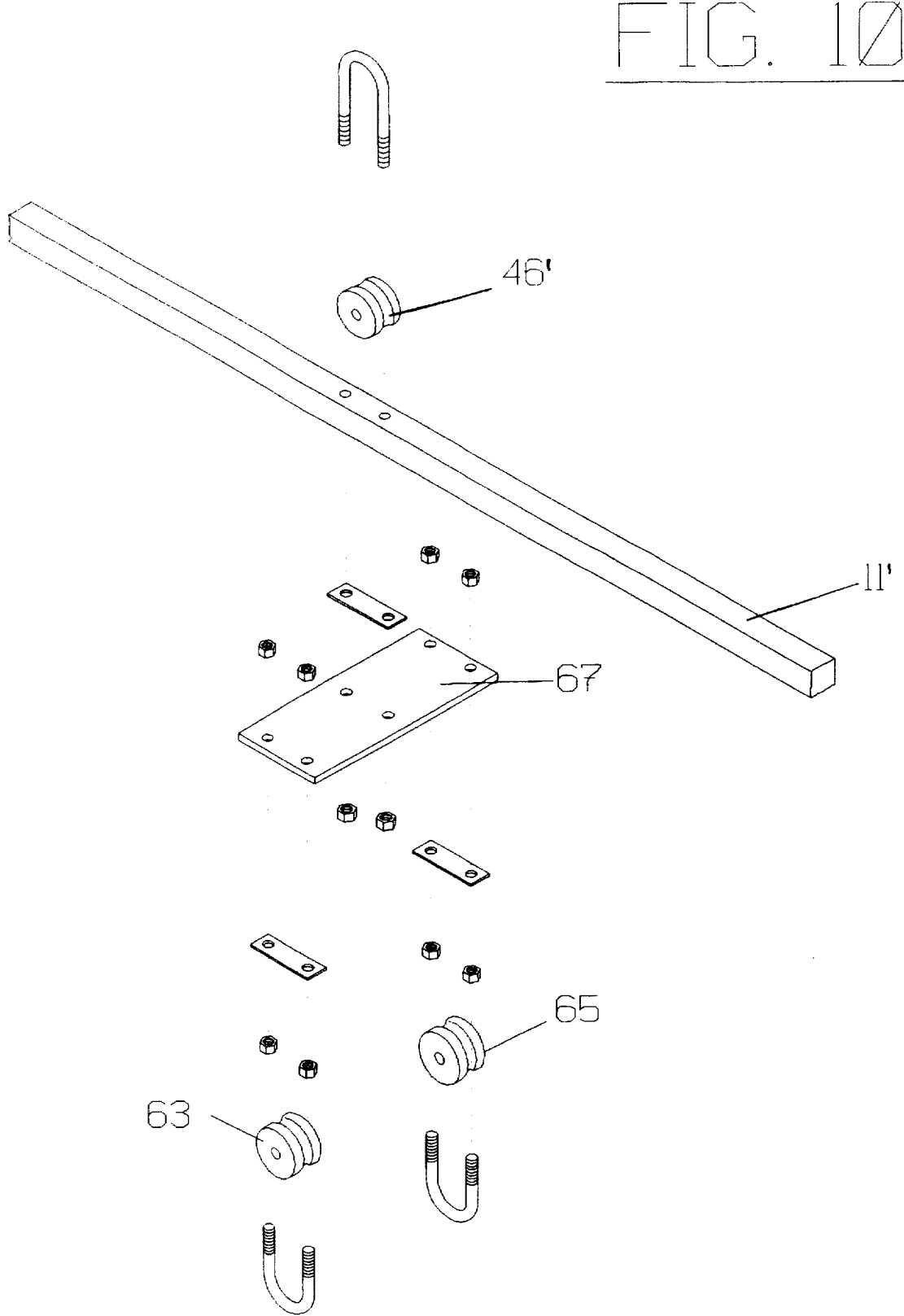
FIG. 10 is an enlarged exploded perspective view showing rope guides for the roll-up crowd gate of FIG. 9.

FIGS. 9 and 10 show an alternate roll-up crowd gate 60 according to the present invention. To enable the carriage 61 of the roll-up crowd gate 60 to closely approach walls 62 at the ends of the tracks 3, the carriage does not have stabilizers. To keep the second run 47' of the wire rope 43' on the insulative sleeve 19', a pair of spaced ring insulators 63 and 65 are fixed to a plate 67. In turn, the plate 67 is fastened to the carriage beam 11'. The ring insulators 63 and 65 assure that the wire rope 43' always wraps around the sleeve 19'.

In summary, the results and advantages of milking dairy cows in multiple herds can now be more fully realized. The roll-up crowd gate provides both gentle urging of only one herd at a time in a desired direction and efficient operation by a single person. This desirable result comes from using the combined functions of the continuous wire rope. As long as the carriage is between the carriage stops 8 and 10, one run of the wire rope pulls the carriage along the tracks 3 between the upstream end 5A and the downstream end 5B without rotation of the drum. Upon striking a carriage stop, the wire rope no longer translates the carriage. Rather, the wire rope causes the drum to turn and raise the electrified cables 35 when the carriage is at the downstream end of the tracks. Reverse turning the handwheel translates the carriage and raised cables in the upstream direction and then lowers the cables to guide a second herd downstream. The dairyman can easily guide separate herds in sequence from a holding area to a milking area from his location near the handwheel 41.

It will also be recognized that in addition to the superior performance of the invention, its cost is modest in comparison to the increased productivity it provides. Moreover, since the roll-up crowd gate is constructed of a simple design and from rugged components, it will give many years of service life with minimal maintenance.

Thus, it is apparent that there has been provided, in accordance with the invention, a roll-up crowd gate that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A roll-up crowd gate comprising:
   a. an elongated track having first and second ends and located above a floor;
   b. carriage means supported on the track for translating between the first and second ends thereof;
   c. drum means for rotating in the carriage means;
   d. a plurality of electrically conductive cables connected each by a first end thereof to the drum means; and
   e. rope means for selectively translating the carriage means and the drum means together between the first and second track ends and for rolling the cables onto the drum means when the carriage means and the drum means are at the track first end and for unrolling the cables from the drum means when the carriage means and drum means are at the track second end.

2. The roll-up crowd gate of claim 1 wherein the carriage means comprises stabilizer means for guiding the carriage means and the rope means when the carriage means translates along the track.

3. The roll-up crowd gate of claim 1 further comprising electrical means for imparting an electrical voltage to the drum means and the cables.

4. The roll-up crowd gate of claim 3 wherein the carriage means comprises:
   a. trolley means for riding in the track;
   b. a long beam supported by the trolley means; and
   c. bearing means joined to the long beam for rotatably supporting the drum means in electrical isolation from the trolley means.

5. The roll-up crowd gate of claim 4 wherein:
   a. the drum means comprises an elongated electrically conductive drum rotatably supported in the bearing means;
   b. an insulative sleeve is fixed on the drum; and
   c. the rope means is wrapped around the insulative sleeve on the drum.

6. The roll-up crowd gate of claim 5 wherein:
   a. the cables have respective first and second ends and equal lengths; and
   b. the first ends of the cables are each connected to the drum at different angular locations therearound, so that the second ends of the cables are at unequal distances above the floor.

7. The roll-up crowd gate of claim 4 wherein the bearing means comprises at least two bearings each comprising:
   a. a fixed block joined to the carriage means beam and having an arcuate journal that rotatably supports the drum means and a pair of spaced apart legs;
   b. a moveable block slidable between the legs of the fixed block and having an arcuate surface of the same diameter as the arcuate journal of the first block; and
   c. spring means for biasing the second block against the drum means, so that the spring means and the moveable block cooperate to compensate for any irregularities in the drum means when the drum means rotates in the bearing means.

8. The roll-up crowd gate of claim 1 wherein the track comprises first and second stop means for limiting the translation of the carriage means at the first and second ends, respectively, of the track.

9. The roll-up crowd gate of claim 8 wherein the rope means comprises:
   a. a pulley at the track first end;
   b. a drive wheel at the track second end; and
   c. a continuous rope arranged over the pulley and the drive wheel, the rope having a run that is wrapped around the drum means.

10. The roll-up crowd gate of claim 9 further comprising a drum stop on the rope run that is wrapped around the drum means, the drum stop cooperating with the carriage means to limit rotation of the drum means.

11. The roll-up crowd gate of claim 9 wherein:
    a. turning the drive wheel in a first direction causes the rope to translate the carriage means and drum means together toward the track first end until the carriage means strikes the first carriage stop and continued turning of the drive wheel in the first direction causes the drum means to rotate and roll the cables onto the drum means; and
    b. turning the drive wheel in a second direction causes the rope to translate the carriage means and drum means together toward the track second end until the carriage means strikes the second carriage stop and continued rotation of the drive wheel in the second direction causes the drum means to rotate and unroll the cables from the drum means.

12. The roll-up crowd gate of claim 9 wherein the carriage means comprises guide means for guiding the rope run that is wrapped around the drum means.

13. The roll-up crowd gate of claim 1 wherein the cables all have equal lengths.

14. The roll-up crowd gate of claim 1 wherein respective second ends of the cables are provided with weights.

15. The roll-up crowd gate of claim 1 further comprising drum stop means for limiting the rotation of the drum means.

16. Apparatus for guiding the movements of cows between upstream and downstream locations comprising:
    a. a track extending between the upstream and downstream locations;
    b. carriage means supported by the track for translating between the upstream and downstream locations;

c. cable means supported on the carriage means for selectively rolling up above the cows and for unrolling upstream of the cows; and d. rope means for selectively translating the carriage means and the cable means together between the upstream and downstream locations, and for rolling up the cable means when the carriage means is at the downstream location, and for unrolling the cable means when the carriage means is at the upstream location.

17. The apparatus of claim 16 wherein the cable means comprises:

a. an electrically conductive drum rotatably supported in the carriage means; and b. a plurality of elongated electrically conductive cables each connected by one end to the drum.

18. The apparatus of claim 17 wherein the rope means comprises a drive wheel, and a continuous rope that is trained around the drive wheel and that has a run that is wrapped around the drum, the drive wheel being turnable in a first direction to cause the rope to translate the carriage means and the drum together to the track downstream location and further turning of the drive wheel in the first direction rotates the drum in a first direction to roll the cables thereon, the drive wheel being turnable in a second direction to cause the rope to translate the carriage means and the drum together to the track upstream location and further turning of the drive wheel in the second direction rotates the drum in a second direction to unroll the cables from the drum.

19. The apparatus of claim 18 wherein the carriage means comprises stabilizer means for aiding and guiding the carriage means to translate in the track and for aiding in wrapping the rope around the drum.

20. The apparatus of claim 18 further comprising stop means on the rope for cooperating with the carriage means to limit the amount of rotation of the drum.

21. The apparatus of claim 17 wherein the carriage means comprises bearing means for rotatably supporting the drum, the bearing means including biasing means for compensating for irregularities in the drum when the drum rotates in the bearing means.

22. The apparatus of claim 21 wherein:

a. electrical voltage is applied to the drum;

b. the bearing means rotatably supports the drum means in electrical isolation from the carriage means;

c. an insulative sleeve is fixed to the drum; and d. the rope is wrapped around the insulative sleeve on the drum, so that only the drum and the cables are charged with electrical voltage.

23. A method of controlling movements of cows comprising the steps of:

a. lowering a plurality of electrically charged cables behind a first herd of cows at an upstream location;

b. translating the cables in a downstream direction to a selected downstream location and thereby urging the first herd of cows to walk to the downstream location;

c. rolling up the cables above the first herd of cows; and d. translating the rolled-up cables in an upstream direction over a second herd of cows to the upstream location.

24. The method of claim 23 wherein the step of lowering a plurality of cables comprises the steps of:

a. connecting one end of each of the cables to a drum on which the cables are rolled; and b. rotating the drum in a first direction and thereby unrolling the cables therefrom to lower the cables.

25. The method of claim 24 wherein the step of translating the cables in a downstream direction comprises the steps of:

a. wrapping a rope around the drum;

b. supporting the drum for rotation in a carriage; and c. pulling the rope in the downstream direction and translating the drum and carriage together to the downstream location.

26. The method of claim 25 wherein the step of rolling up the cables comprises the steps of:

a. stopping the carriage at the downstream location;

b. continuing pulling the rope in the downstream direction; and c. rotating the drum in a second direction and rolling up the cables onto the drum.

27. The method of claim 26 comprising the further step of guiding the rope on the drum when the cables are rolled up and unrolled from the drum.

28. The method of claim 25 wherein the step of translating the rolled cables in an upstream direction comprises the steps of pulling the rope in the upstream direction, and translating the drum and carriage together to the upstream location.

* * * * *